United States Patent [19]

Pohlmann et al.

[11] Patent Number: 4,718,649
[45] Date of Patent: Jan. 12, 1988

[54] ROLLING BELLOWS FOR PNEUMATIC CUSHIONING OF A VEHICLE

[75] Inventors: Klaus Pohlmann, Wunstorf; Konrad Müller, Garbsen; Hartwig Voss; Gunter Drescher, both of Hanover; Gerhard Thurow, Garbsen, all of Fed. Rep. of Germany

[73] Assignee: Continental Gummi-Werke Aktiengesellschaft, Hanover, Fed. Rep. of Germany

[21] Appl. No.: 835,968

[22] Filed: Mar. 4, 1986

Related U.S. Application Data

[63] Continuation of Ser. No. 610,576, May 16, 1984, abandoned.

[30] Foreign Application Priority Data

May 18, 1983 [DE] Fed. Rep. of Germany ....... 3318060

[51] Int. Cl.⁴ ................................................. F16F 9/04
[52] U.S. Cl. .................................. 267/64.24; 92/34; 188/298; 267/64.21; 267/122
[58] Field of Search ............... 267/64.23, 64.24, 64.27, 267/64.11, 64.21, 35, 63 R, 122, 120, 140.1, 141, 149, 151–153; 188/298; 92/98 D, 92, 42, 34

[56] References Cited

U.S. PATENT DOCUMENTS

| | | |
|---|---|---|
| 1,902,323 | 3/1933 | Monge ................................... 92/42 |
| 2,192,355 | 3/1940 | Kuhn ..................................... 267/35 |
| 3,043,582 | 7/1962 | Hirtreiter ........................ 267/64.24 |
| 3,255,677 | 6/1966 | Hesse ................................. 92/92 X |
| 3,402,924 | 9/1968 | Rix ..................................... 267/63 R |
| 3,526,171 | 9/1970 | Barnes ................................. 92/98 D |
| 3,549,142 | 12/1970 | Tilton ............................... 267/64.24 |
| 3,584,845 | 6/1971 | Hoffman ............................. 267/120 |
| 3,598,155 | 8/1971 | Burkley ............................. 92/34 X |
| 4,092,017 | 5/1978 | Urushiyama et al. ............ 267/64.27 |
| 4,352,437 | 10/1982 | Shtarkman .......................... 267/35 |
| 4,386,791 | 6/1983 | Wantanabe ................... 267/64.21 X |
| 4,428,302 | 1/1984 | Herring ........................ 267/64.11 X |

FOREIGN PATENT DOCUMENTS

| | | | |
|---|---|---|---|
| 977784 | 11/1975 | Canada ............................. 267/63 R |
| 1806927 | 6/1969 | Fed. Rep. of Germany ... 267/64.27 |

Primary Examiner—George E. A. Halvosa
Assistant Examiner—Matthew C. Graham
Attorney, Agent, or Firm—Becker & Becker, Inc.

[57] ABSTRACT

A rolling bellows for pneumatic cushioning or shock absorption of a vehicle. Such rolling bellows are stressed particularly severely during telescoping in the pressureless state during assembly and also under emergency conditions. In order to avoid the occurrence of tension cracks from such causes, the rolling bellows are provided in the region of the cylindrical curvature, and on the inner surface, with integrally formed-on raised surface portions.

8 Claims, 2 Drawing Figures

U.S. Patent
Jan. 12, 1988
4,718,649
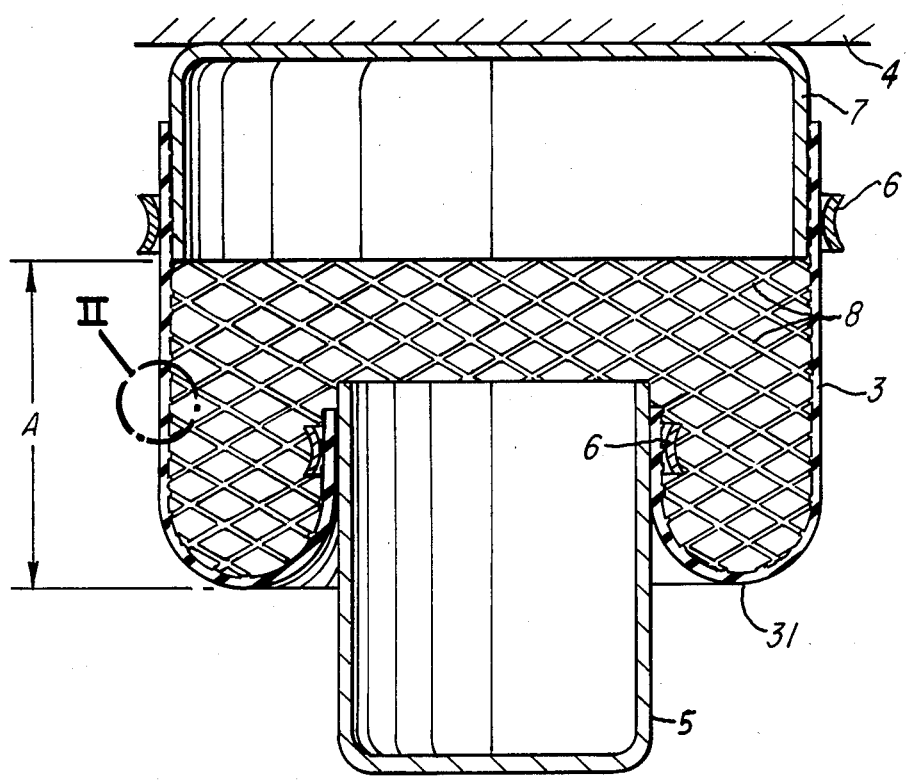
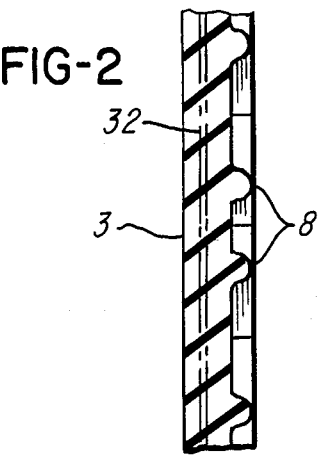

ROLLING BELLOWS FOR PNEUMATIC CUSHIONING OF A VEHICLE

This is a straight continuation of co-pending application Ser. No. 610,576-Pohlmann et al filed May 16, 1984, now abandoned.

BACKGROUND OF THE INVENTION

1. Field of the Invention

The present invention relates to a rolling bellows for pneumatic cushioning or shock absorption of a vehicle. The rolling bellows is in the form of a cylindrical tube body of rubber or rubber-like synthetic material, and is provided with reinforcing inserts. In the installed state, the rolling bellows is supported against the outer surface of a rigid rolling cylinder while forming a cylindrical curvature.

2. Description of the Prior Art

The movable cylindrical curvature of the installed rolling bellows, which is subjected to the operational air pressure, collapses along with the constantly changing transition between different bellows diameters. Therefore, already with the insertion of such pneumatic cushioning bellows into the vehicle structure, the cylindrical curvature must appear at a location which is particularly prone to tension cracks. The first experiences with the new type of cushioning system apparently proved this to be correct. The endeavors based hereon for improving the rolling bellows led to the known proposal of U.S. Pat. No. 3,598,155—Burkley dated Aug. 10, 1971 and corresponding German Pat. No. 1 806 927 of providing the inner surface of the cylindrical curvature with grooves which extend in the circumferential direction pursuant to the disposition pattern which results from the stresses during use. The development of new elastomeric materials and construction measures for the rolling bellows, and the use of improved manufacturing methods, allowed the original significance of this type of damage to become less important. Instead, as much more important there has now surfaced the problem of the crease-free telescoping of the bellows in the pressureless state during the course of assembly, and especially under the limited space conditions of the chassis; associated with this problem is the facilitated rolling in the pressureless state under emergency conditions. No improvements toward this end could be achieved with the heretofore known solution of molding peripheral grooves in the walls of the bellows.

An object of the present invention therefore is to overcome this particular problem with a novel construction of the pneumatic cushioning bellows, and to affect the rolling conditions in the pressureless state of the bellows in such a way that the danger of premature destruction as a result of the formation of creases or cracks is practically eliminated.

BRIEF DESCRIPTION OF THE DRAWING

This object, and other objects and advantages of the present invention, will appear more clearly from the following specification in conjunction with the accompanying drawing, in which:

FIG. 1 is a schematic axial sectional view taken through one inventive embodiment of a pneumatic cushioning tube type rolling bellows in the installed state; and FIG. 2 shows in detail and to a larger scale the encircled portion II in FIG. 1.

SUMMARY OF THE INVENTION

The rolling bellows of the present invention is characterized primarily in that in the region of the cylindrical curvature, the inner surface of the rolling bellows is provided with integrally formed-on raised surface portions which are distributed over the entire periphery; these raised portions have a height which is only a fraction of the wall thickness of the bellows, preferably being less than 1 mm. The raised surface portions can be isolated individual elements which are disposed adjacent to one another, for example, in the form of knobs or projections, cylindrical or polyhedral pins or studs, truncated cones or pyramids, etc. The individual raised surface portions also may be disposed in parallel rows which are offset relative to the circumferential direction. Another possibility is to construct the raised surface portions in the form of continuous ribs, ridges, or similar linear structures having a cross section in the form of a rounded-off dome. The ribs or the like may be disposed in two groups which intersect one another. These ribs may be disposed in groups which extend in the axial and circumferential direction. Alternatively, the ribs may be disposed in groups which intersect one another at an angle relative to the axial direction.

The inventive breaking-up of the inner surface of the bellows in the region of the cylindrical curvature into a plurality of raised surface elements which are separated from one another suprisingly aids the direct sliding or rolling of these partial surfaces on one another, which situation is unavoidable on the one hand already during installation of the bellows into the cushioning system, and on the other hand, also inherently occurs during emergency operating conditions upon the loss of compressed air. As a result of the inventive surface structuring, the affected wall portions can roll off on one another even under stress in changing directions without encountering the otherwise constantly arising danger of premature destruction due to folds and localized chafing damage. The thus achieved insensitivity of the rolling bellows to extreme conditions operates as a particular advantage of the present invention to prolong the useful life thereof.

DESCRIPTION OF PREFERRED EMBODIMENTS

Referring now to the drawing in detail, the illustrated rolling bellows 3 is in the form of a tube body which originally has a cylindrical, conical, or spherical contour, and is made of an oil-resistant rubber having reinforcing inserts 32 which are shown in FIG. 2. The rolling bellows 3 is used as a spring element between the chassis 4 of a motor vehicle, and a rolling cylinder 5 which cooperates with a shaft or axle. By means of rolled-on clamping rings 6, the rolling bellows 3 is secured not only on a cylindrical mounting part 7 associated with the chassis 4, but also on the rolling cylinder 5. Via non-illustrated control valves, the rolling bellows 3 is inflated with compressed air to a pressure which depends upon the loading of the vehicle; under the effect of the inner pressure, the rolling bellows 3 assumes the illustrated shape, which is predetermined by the type and arrangement of the reinforcing inserts, and which has a cylindrical curvature in its lower, i.e. radially inward, region; during the course of the spring movements, the cylindrical curvature 31 rides on the outer surface of the rolling cylinder 5. The continually open connection between the rolling bellows 3 and the rolling cylinder 5 means that in addition to the bellows volume, the cylinder volume also can be relied upon for the spring action.

In the lower bellows portion A, which includes the cylindrical curvature 31, the inner surface of the otherwise smooth-walled rolling bellows 3 is provided with integrally formed-on linear raised surface portions 8 which intersect one another in a rhombus or diamond pattern. The raised surface portions 8 respectively extend in two linear systems which are angularly disposed relative to one another; they extend over the entire inner surface. The height of the raised portions 8 beyond the surface of the inner wall corresponds to only a small fraction of the wall thickness, and is, for example, 0.1 mm to 0.5 mm.

The present invention is, of course, in no way restricted to the specific disclosure of the specification and drawings, but also emcompasses any modifications within the scope of the appended claims.

What we claim is:

1. A rolling bellows for pneumatic cushioning of a vehicle during which problems of creasing and telescoping of parts are encountered via reduction of friction so that facing wall parts may slide against each other easily; said bellows being in the form of a tube body extending in an axial direction and which is made of rubber or rubber-like synthetic material including an interior surface having an entire periphery in a circumferential direction as well as a bellows wall having a thickness, and includes reinforcing inserts; in the installed state, said bellows including an interior surface as well as a substantially smooth outer surface supported in rolling contact against an outer surface of a rigid rolling cylinder, at the same time forming a cylindrical curvature which may encouter a problem at a location therewith which is particularly prone to tension cracks and also to encounter a problem of crease-free telescoping of the bellows in the pressureless state during assembly although subject to limited space conditions;

the improvement in combination therewith which comprises integrally formed-on raised surface portions which intersect one another in a rhombus-diamond-shaped configuration located over the entire interior surface of said bellows wall itself and in the region of said cylindrical curvature, said integrally formed-on raised surface portions extending in two linear systems angularly disposed relative to one another and being distributed over the entire interior surface; said raised surface portions extending from said interior surface by a distance of less than 1 mm which corresponds to only a fraction of the thickness of the wall of said bellows; said raised surface portions serving for breaking-up interior surface of the bellows in the location of the cylindrical curvature into a plurality of raised surface elements defining partial surfaces therewith to aid in direct sliding and rolling of such partial surfaces on one another to permit rolling off as to each other even under stress in changing directions without encountering otherwise constantly arising danger of premature destruction due to folds and localized chafing damage and so as to facilitate rolling in a pressureless state under emergency conditions such that danger of premature destruction as a result of formation of creases and cracks is practically eliminated and to achieve insensitivity of said rolling bellows to extreme operational conditions as well as to prolong useful life thereof.

2. A rolling bellows in combination according to claim 1, in which said raised surface portions extend from said interior surface by range of 0.1 to 0.5 mm.

3. A rolling bellows in combination according to claim 2, in which said raised surface portions are disposed next to one another.

4. A rolling bellows in combination according to claim 3, in which said individual raised surface portion elements are disposed in parallel rows which are offset relative to the circumferential direction.

5. A rolling bellows for pneumatic cushioning of a vehicle during which problems of creasing and telescoping of parts are encountered via reduction of friction so that wall parts slide against each other easily; said bellows being in the form of a tube body extending in axial direction and which is made of rubber or rubber-like synthetic material including an interior surface having an entire periphery in a circumferential direction as well as a bellows wall having a thickness, and includes reinforcing inserts; in the installed state, said bellows including an interior surface as well as a substantially smooth outer surface supported in rolling contact against an outer surface of a rigid rolling cylinder, at the same time forming a cylindrical curvature which may encounter a problem at a location therewith which is particularly prone to tension cracks and also to encounter a problem of crease-free telescoping of the bellows in the pressureless state during assembly although subject to limited space conditions;

the improvement in combination therewith which comprises integrally formed-on raised surface portions which intersect one another in a rhombus-diamond-shaped configuration located over the entire interior surface of said bellows wall itself and in the region of said cylindrical curvature, said integrally formed-on raised surface portions extending in two linear systems angularly disposed relative to one another and being distributed over the entire interior surface; said raised surface portions extending from said interior surface by a distance which corresponds to only a fraction of the thickness of the wall of said bellows; said raised surface portions serving for breaking-up interior surface of the bellows in the location of the cylindrical curvature into a plurality of raised surface elements defining partial surfaces therewith to aid in direct sliding and rolling of such partial surfaces on one another to permit rolling off as to each other even under stress in changing directions without encountering otherwise constantly arising danger of premature destruction due to folds and localized chafing damage and so as to facilitate rolling in a pressureless state under emergency conditions such that danger of premature destruction as a result of formation of creases and cracks is practically eliminated and to achieve insensitivity of said rolling bellows to extreme operational conditions as well as to prolong useful life thereof;

said raised surface portions extending from said interior surface in a range of 0.1 mm to 0.5 mm;

said raised surface portions being in the form of continuous linearly extending structures having a rounded-off cross section which resembles a dome.

6. A rolling bellows in combination according to claim 5, in which said linearly extending raised surface portion structures are ribs which are disposed in two groups, with the ribs of one of said groups adjoining the ribs of the other of said groups.

7. A rolling bellows in combination according to claim 6, in which one of said groups of ribs extends in the axial direction, and the other of said groups of ribs extends in the circumferential direction.

8. A rolling bellows in combination according to claim 6, in which said intersecting groups of ribs each extend at an inclined angle relative to the axial direction.

* * * * *